Dec. 4, 1956  E. E. MAGNUSON  2,772,993
REINFORCED LAMINATED SHEET
Filed Oct. 17, 1951  2 Sheets-Sheet 1
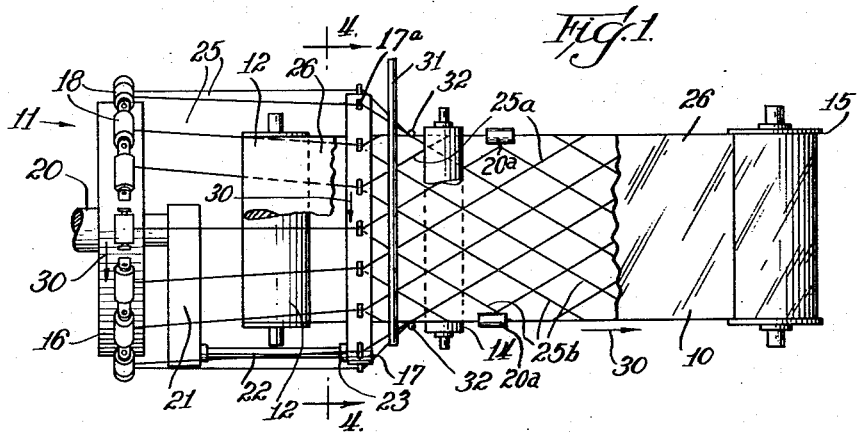
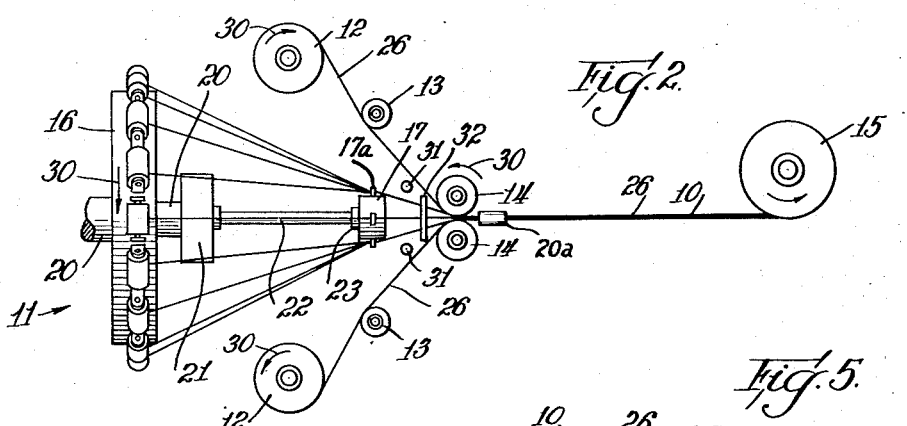
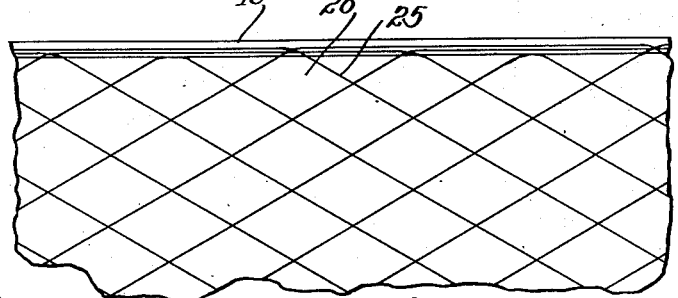
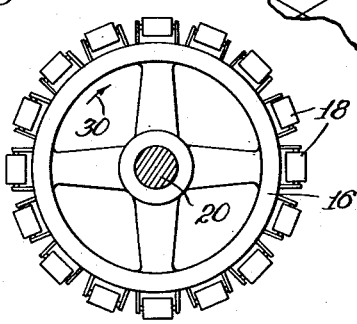
Inventor:
Elton E. Magnuson
By:- Harbaugh & Hinrichs
Att'ys.

Dec. 4, 1956  E. E. MAGNUSON  2,772,993
REINFORCED LAMINATED SHEET
Filed Oct. 17, 1951  2 Sheets-Sheet 2
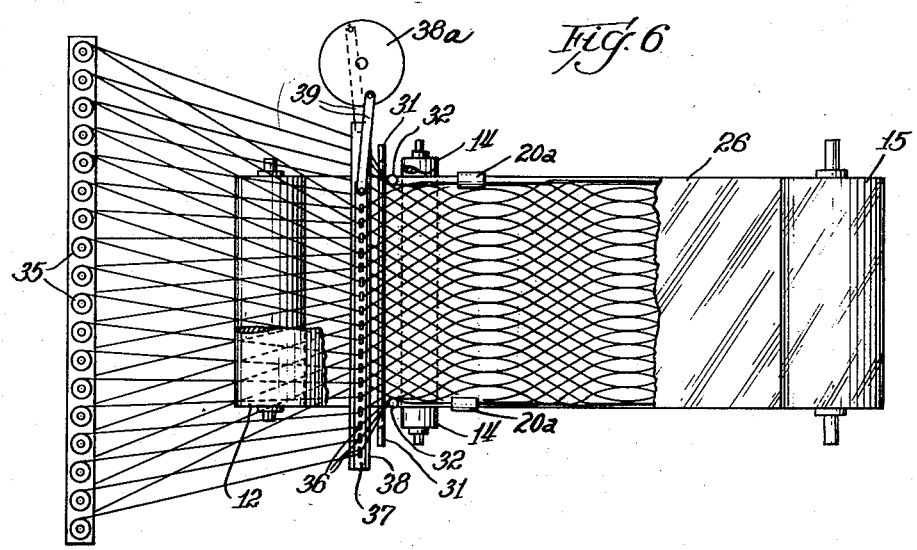
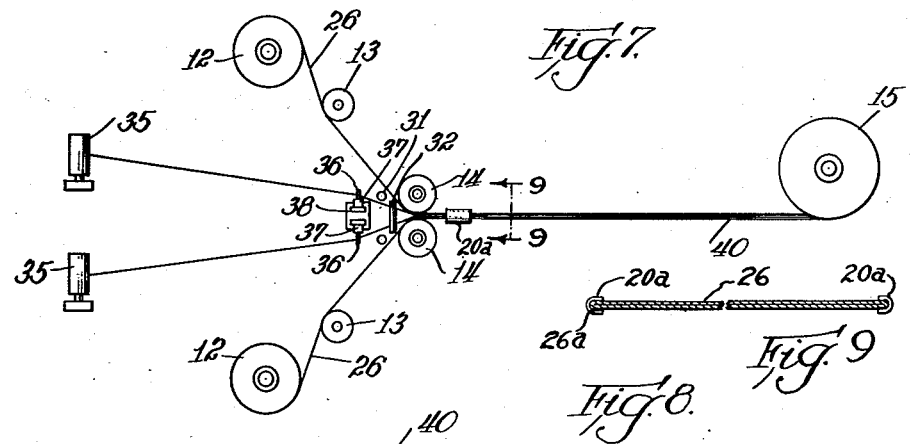
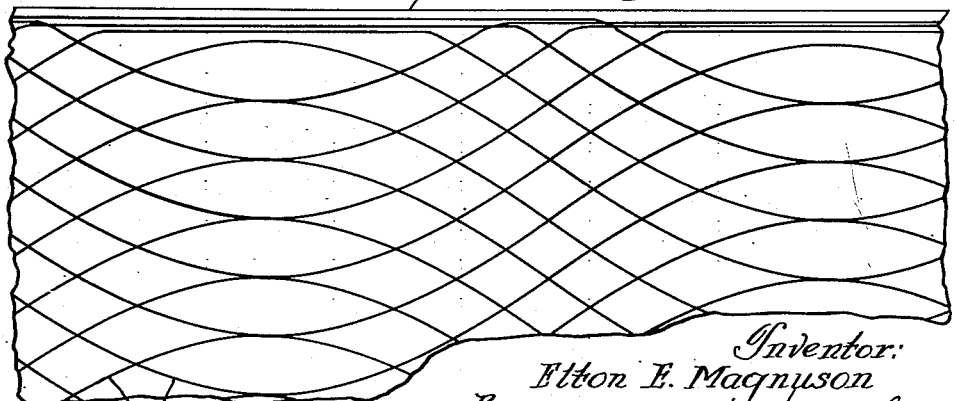
Inventor:
Elton E. Magnuson
By:- Harbaugh and Hinrichs
Attys.

United States Patent Office 2,772,993
Patented Dec. 4, 1956

2,772,993

REINFORCED LAMINATED SHEET

Elton E. Magnuson, Ann Arbor, Mich.

Application October 17, 1951, Serial No. 251,729

6 Claims. (Cl. 154—52)

This invention relates generally to reinforced sheets, sometimes referred to herein as webbed sheets, of thin plastic material and more particularly to an improved sheet having overlapping reinforcing webs of plastic monofilament and to a novel apparatus and process for making such sheets.

An open wire or cord weave coated with translucent plastic has been used as a substitute for window glass. The manufacture of such sheet materials is beset with many difficulties. First, the weave has to be made as inventory and carefully stored. Then when it is being coated, great care has to be employed not to displace any of the threads, because the end product is correspondingly depreciated in appearance. In fact, in order to provide an acceptable product, the wire or cord must be woven to be handled, and when handled, great care has to be exercised not to disturb the open weave in handling and tensioning the weave in the process. Thus extensive equipment in the form of looms generally operated by a weaving company and separate plastic applicator apparatus operated by another company are required to manufacture such sheets.

Moreover, the applicating process can use the weave much faster than it can be manufactured, and for that reason the two processes cannot be combined in one operation. The applicator cannot successfully operate as slowly as the loom.

One object of this invention is to produce a webbed sheet or film having all the advantages of the prior sheeting, and many more besides, but which may be fabricated in a single step process directly from plastic monofilament, or the like, and plastic film sheet.

Another object is to provide an apparatus which will produce a different weave design without need for changing the stock fed into the machine.

A related object is to provide a simple apparatus which is capable of forming such material in various designs in a single operation at high production speeds.

Another object is to provide a product which is substantially homogeneous in its construction so as to have a better resistance to weathering and mechanical strain.

A further object is to provide a continuous webbed sheet which may have both sides smooth so that the surfaces are easy to clean and which has a reinforced edge to provide extra strength for mounting the sheet in an opening.

A further object is to provide an arrangement whereby attractive appearing patterns may be woven, provision being made for pattern variation by simple adjustment of the apparatus. The invention is further characterized by the interchangeable use of round monofilament or a flat monofilament when "leaded glass" appearance is desired.

Other objects and advantages of this invention will present themselves to those familiar with the art on reading the following specification in conjunction with the drawings and the appended claims.

In the drawings:

Fig. 1 is a top view of a preferred embodiment of a webbed or reinforced sheet forming apparatus for fabricating the sheet material of this invention, the apparatus being shown with portions of the upper film feed rolls removed;

Fig. 2 is a front view thereof;

Fig. 3 is an end view showing the rotatable spool holder;

Fig. 4 is a section taken on line 4—4 of Fig. 1;

Fig. 5 is an enlarged plan view of a portion of the webbed sheet;

Fig. 6 is a top view of a modified embodiment of the apparatus;

Fig. 7 is a front view of the modified apparatus;

Fig. 8 is a plan view of the modified webbed sheet fabricated by the modified apparatus, and Fig. 9 is a vertical sectional view of the edge folding for the sheet of the invention taken along the line 9—9 of Fig. 7.

The sheet material of this invention comprises a backing layer of transparent plastic film material and integrally therewith a plurality of plastic filaments extending longitudinally and transversely over the surface to form an interlocking or overlying reinforcement but not an interwoven web. A facing layer of film similar to if not identical with, the backing layer is preferably employed, but may be omitted if desired. It is preferred to employ plastic film and filaments of the same or closely related materials, and the whole are homogeneously bonded together to form an integral sheet progressively and simultaneously with the formation of the reinforcement.

A preferred form of reinforced sheet 10 and apparatus 11 for fabricating same is illustrated in Figs. 1–5 of the drawing. The construction of the novel sheet 10 is most easily understood by reference to the apparatus 11; and, accordingly, the apparatus will be described first.

The apparatus 11 comprises a pair of plastic film supply rolls 12, associated guide rolls 13, a pair of laminating rolls 14, a takeup roll 15 and the filament handling mechanism. This mechanism includes a rotatable spool carrier wheel 16 and a guide eyelet conveyor 17.

The spool carrier 16, which is best shown in Fig. 3, is in the form of a large wheel having a plurality of spools 18 disposed about its periphery. Each spool 18 carries a supply of plastic monofilament and is loaded to provide a uniform tension upon the filament. The large wheel is supported upon an axle 20 which is arranged to be driven at a uniform speed. The axle 20 extends through the wheel to a speed increasing gear train 21 which drives a drive shaft 22 connected to the guide eyelet conveyor 17. This conveyor is supported upon a pulley 23, driven by the shaft 22, and an idler pulley 24.

The speed change gearing 21 is so constructed as to drive the conveyor 17 at the same speed as the spool wheel 16 to prevent the filaments 25 from twisting. Actually the wheel 16 may be eliminated if desired, and the spools 18 may be carried by the conveyor 17. It is desirable, however, to locate the conveyor as near as possible to the laminating rolls 14, and by separately supporting the spools 18 on the wheel 16 this is facilitated.

The operation of the apparatus 11 is as follows: The laminating rollers 14 and takeup roll 15 are driven to draw the plastic film 26 from the feed rollers 12 through the device at a constant speed. Simultaneously, the shaft 20 is driven to move the spool wheel 16 and the eyelet conveyor 17. The linear speed of the conveyor 17 is slightly slower than the speed of the plastic film 26 to produce the diamond shaped web pattern shown in Figs. 1 and 5. Decreasing the relative speed of the conveyor 17 widens the diamonds while increasing it narrows them.

As the conveyor belt 17 moves, each filament 25 is pulled crosswise with respect to the moving films 26 traversing the films in one direction during the time it is on top of the conveyor and in the opposite direction when on the bottom. Thus when the various elements are moving in the directions indicated by the arrows 30 the monofilaments 25a which are carried by the top span of the conveyor 17 are inclined as indicated in Fig. 1 and lie on top of the monofilaments 25b which are led through the eyelets on the lower side of the conveyor 17. The filaments are not interwoven but merely overlap one another. However, with lamination, as the two films pass through the rollers 14, the filaments and films are so closely bonded together that the ultimate effect is much better than if the filaments had actually been interwoven. Their thickness is less than that found in some weaves, and they are bonded to each other at the overlap better than a weave because of the conditions under which the overlap is made as hereinafter described under heat and pressure in the presence of a solvent.

To facilitate lamination of the films 26 and the filaments 25 the rollers 14 may be heated and a solvent or adhesive sprayed from the pipes 31 close to the laminating rollers 14 in a mist which is deposited on the filaments and the films. With certain plastics heat alone is sufficient to accomplish the lamination while in other cases adhesive or solvent without heat may be used.

On examination of Fig. 1 of the drawing it will be noted that the ends of the conveyor belt 17 extend somewhat beyond the sides of the film strips 26. This is done for two purposes. First, it causes the filaments 25 to follow straight lines all the way to the edges of the sheet 26 as the guide eyelets 17a move to a position just slightly beyond the edge of the film where the filaments engage a guide bar 32 at each side of the sheet disposed slightly inside the edge. Thereafter the second purpose of extending the conveyor belt beyond the sides of the strip 26 is accomplished in the guide bar 32 feeding the filament at a fixed point so as to let the filament run lengthwise of the film for a short distance to provide reinforced edges on the finished sheet 26. This feature is best shown in Fig. 5 where it will be seen that each of the filaments 25 extends almost to the edge of the sheet and then follows down the edge of the sheet until preferably three more filaments have reached the edge before starting back across the sheet in the opposite direction. Thus the filaments are overlapped in close relation to each edge like a cable or reinforcing bead which provides great strength at the point where it is most needed. This is particularly advantageous when the sheet is to be nailed into window openings, etc. by tacks or staples disposed along the edges.

If desired, the edges of the film 26 may be folded inwardly to form a closed edge just after lamination by providing guide elements 20a similar to hemmer attachments used on sewing machines. When this is done it is preferred to use upper and lower films of the same width, one film being disposed slightly to one side of the other, so that the edge 26a of upper film 26 may be folded downwardly at one side and around the edge of the lower sheet 26, while at the other side the edge 26b of the said lower sheet is folded upwardly and around the edge of the first mentioned sheet. When this is done the edges are completely waterproofed so that moisture cannot enter to cause discoloration or separation.

From the foregoing description it will be appreciated that the sheet 26 is novel in construction in that the filaments are not interwoven, are homogeneously bonded to the film layers and to each other to reinforce the sheet with a pleasing appearance and also provide a reinforced or selvage edge. It is interesting to note that bubbles of air cannot be trapped between the film layers since the lamination is progressively made from one end of each diamond to the other with the result that air is squeezed from between the sheets during lamination and is free to flow past the intersecting filaments of each diamond just prior to the moment that they are pressed together.

As stated previously, the apparatus may be operated using only one film layer to produce a finished sheet having the filaments exposed on one side simply by eliminating the upper film supply roll.

The apparatus of this invention may, of course, be used to reinforce a film with wire or string if desired. Similarly, the monofilaments may be in the form of ribbons or tapes, if desired, for interesting decorative effects.

The embodiment of the invention illustrated in Figs. 6–8 of the drawing is somewhat different in appearance from the preferred arrangement, but the operation of the apparatus and the resulting product are actually closely related. In fact, an effect similar to that accomplished in Figs. 6–8 can be accomplished by oscillating the spool carrier 16 and guide eyelet conveyor 17 instead of rotating them. In the drawings, like elements of the two embodiments have been given like numerals.

In the modification, however, it is preferred to have the filament spools 35 stationary and reciprocate eyelet bars to accomplish the overlapping of the filaments which produces increased strength in the finished sheet. The guide eyelets 36, therefore, are supported upon reciprocating carriers 37. These carriers are mounted in a slide 38 disposed in substantially the same position as the conveyor 17 in the preferred embodiment and are arranged to reciprocate alternately so that while the upper carrier 37 is moving in one direction the lower carrier is moving in the opposite direction. This is accomplished by a rotatable crank member 38a which is connected to the carriers 36 by links 39.

The webbed sheet 40 produced by the modified embodiment is shown in Fig. 8. As shown in that figure, each of the filaments 25 follows a sinusoidal path and intersects the two adjacent filaments to form an interlocked pattern. By varying the relative amount and quickness of reciprocal travel of the carriers 37 with respect to the spaces in between the filaments the degree and shape of overlapping of each filament and adjacent filaments may be controlled. Thus, if the travel of the carriers is approximately twice the spacing between the filaments, a double interlocked pattern such as illustrated in Fig. 8 will be formed. If the spacing is three times the interfilament distance a triple overlap will result. Thus this pattern may be easily controlled, and, in general, the higher the degree of overlap, the greater the strength of the resulting sheet 40. The period of the sinusoidal reciprocations of course depends upon the speed of the film 26 with respect to the frequency of reciprocation.

As shown in Fig. 8 the edges of this sheet 40 are reinforced in much the same manner as the edges in the preferred embodiment due to the over travel of the carrier elements 37 past the sides of the film 26. As in the preferred embodiment the guide bars 32 keep the filaments within the sheet edges.

Although many different plastic films and filaments may be used to form the sheets of this invention, it is preferred to use vinylidene chloride mono-filament, which has been stretched approximately 400 percent after extrusion to orient the molecules, in combination with vinyl chloride film for the backing layers, utilizing a solvent such as cyclo-hexanone which softens both materials. Other combinations of materials and solvents which are compatible may also be employed as long as the materials will form a satisfactory laminate.

Furthermore, with the embodiment shown in Fig. 1 the mixing up of different periods of rotation with different periods of oscillation of the spool carrier and eyelet carrier provides a variety of designs in which diamond lines are associated with curved lines.

From the foregoing it will be appreciated that an improved article has been provided, as well as a simplified process and apparatus for producing such articles. Various changes and modifications in addition to those set forth herein may be made without departing from the spirit of this invention whose scope is commensurate with the following claims.

What is claimed is:

1. A laminated transparent plastic sheet comprising two layers of plastic film bonded together, and continuous overlapping filaments spanning said sheet transversely on two sets of parallel and substantially diagonal lines intersecting one another defining a diamond pattern, the filaments traversing the sheet in one direction lying on top of the filaments traversing it in the other direction, each of said filaments extending longitudinally of said layers for a predetermined distance in proximate spaced relation to the edges of said layers so that the several filaments overlap and form reinforcing beads, and all of said filaments being disposed between said layers of film, the edges of the film being folded inwardly around the reinforcing beads.

2. A laminated plastic sheet comprising two layers of plastic film bonded together, and a plurality of individual filaments traversing said sheet obliquely on two sets of parallel lines defining a diamond pattern, all of the filaments traversing the sheet in one direction being parallel and crossing on top of all of the filaments traversing it in the other direction, each of said filaments extending longitudinally of said layers for a predetermined distance in proximate spaced relation to the edges of said layers so that the several filaments overlap and form reinforcing beads, and all of said filaments being disposed between said layers of film, said film being folded inwardly around the reinforcing beads to form sealed edges.

3. A webbed plastic sheet comprising a layer of plastic film, and continuous overlapping filaments traversing said film transversely in two sets of parallel and diagonal lines defining a diamond pattern, the filaments traversing the film in one direction lying on top of the filaments traversing it in the other direction and extending longitudinally of said film for a predetermined distance in proximate spaced relation to the edges of said film so that the several filaments overlap and form reinforcing beads.

4. A webbed plastic sheet comprising a layer of plastic film, and continuous overlapping filaments crossing said film obliquely on two sets of parallel lines defining a diamond pattern, the filaments traversing the film in one direction lying on top of the filaments traversing it in the other direction, and each of said filaments on reaching a margin of the film extending along said margin in close proximity to other of said filaments for a short distance before extending back across the film in the opposite direction to form a reinforced edge in which successive filaments overlap to form a bead, the edges of said film being folded inwardly over said beads thus forming sealed edges.

5. A laminated plastic sheet comprising two layers of plastic film bonded together with one displaced slightly to one side of the other, and overlapping filaments disposed between said layers, half of said filaments crossing on top of the other half, the single layer margins formed by displacing said layers being folded around the marginal edge of the adjacent layer of the sheet.

6. The combination of claim 5 the filaments traversing the sheets on intersecting diagonal lines defining a diamond pattern.

References Cited in the file of this patent

UNITED STATES PATENTS

| | | |
|---|---|---|
| 1,183,437 | Cooper | May 16, 1916 |
| 1,192,568 | Tcherf | July 25, 1916 |
| 1,460,949 | Currier | July 3, 1923 |
| 1,494,970 | Wandel | May 20, 1924 |
| 1,679,721 | Howard | Aug. 7, 1928 |
| 1,872,316 | Meeker | Aug. 16, 1932 |
| 1,894,219 | Gibbs | Jan. 10, 1933 |
| 1,923,837 | McLaurin | Aug. 22, 1933 |
| 1,951,301 | Angier et al. | Mar. 13, 1934 |
| 2,203,822 | Hyman | June 11, 1940 |
| 2,281,635 | Strauss | May 5, 1942 |
| 2,332,373 | Dorough et al. | Oct. 19, 1943 |
| 2,361,369 | Grebe et al. | Oct. 31, 1944 |
| 2,490,451 | Magid | Dec. 6, 1949 |
| 2,522,527 | Manning | Sept. 19, 1950 |
| 2,561,781 | Bruce | July 24, 1951 |
| 2,575,666 | Knudson | Nov. 20, 1951 |
| 2,610,936 | Carlson | Sept. 16, 1952 |
| 2,614,054 | Baisch et al. | Oct. 14, 1952 |

FOREIGN PATENTS

| | | |
|---|---|---|
| 9,983 | Great Britain | 1915 |